UNITED STATES PATENT OFFICE.

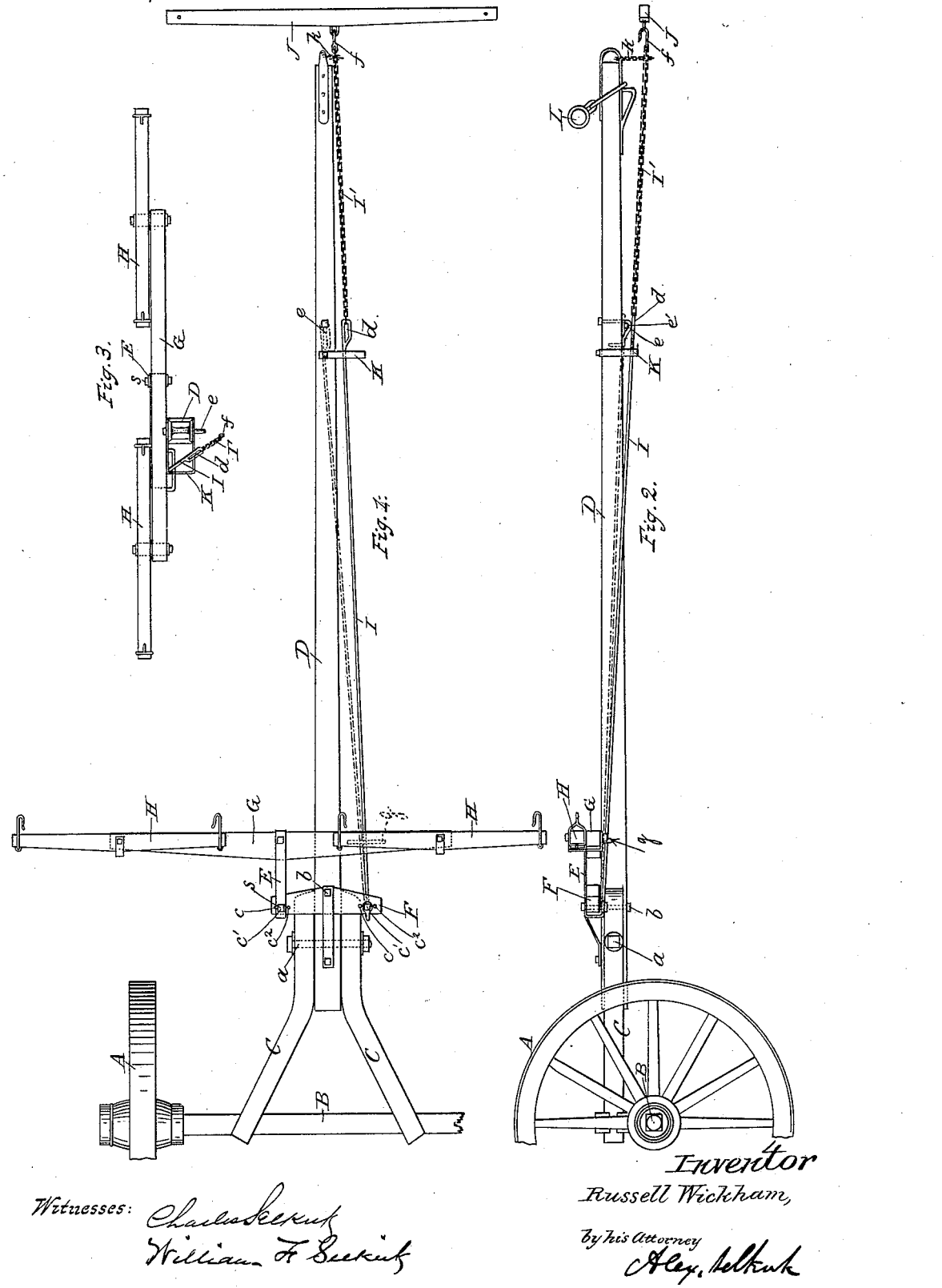

RUSSELL WICKHAM, OF CANAAN, NEW YORK.

DRAFT-EQUALIZER.

SPECIFICATION forming part of Letters Patent No. 463,772, dated November 24, 1891.

Application filed March 22, 1889. Serial No. 304,242. (No model.)

*To all whom it may concern:*

Be it known that I, RUSSELL WICKHAM, a citizen of the United States, residing at Canaan, in the county of Columbia and State of New York, have invented new and useful Improvements in Draft-Equalizing Devices for Vehicles, Machines, &c., of which the following is a specification.

My invention relates to draft-equalizing devices for vehicles, machines, and agricultural implements drawn by animals; and it consists of the combinations of devices and elements hereinafter particularly described, and specifically set forth in the claims.

The objects of my invention are to combine with the draft-tongue of vehicles and machines a draft-equalizing lever, doubletree and connection, and a leader draft-rod in such a manner that the draft of the leaders will operate not only to contribute to the drawing of the load, but also to adjust the resistance to the draft equally to the wheel-horses, and also to produce a combination of devices by which heavy leading draft-animals and light wheel draft-animals or the reverse can have each their proportionate weight of the load to be drawn transferred to them, and also to provide the combination of devices and elements by which the parts of this device can be suitably adjusted for operation whether two, three, or four or more animals are used for drawing the vehicle or other articles. I attain these objects by the means illustrated in the accompanying drawings, forming a part of this specification, in which—

Figure 1 represents a plan view of the draft-tongue of a vehicle in place with the hounds of the latter and having with it the improvements in my invention. Fig. 2 is a side elevation of the same. Fig. 3 is a front view of the same.

The same letters of reference refer to like parts throughout the several views.

A A are the forward wheels of the vehicle. B is the axle; C C, the hounds, and D the draft-tongue, which latter is pivoted to the hounds by pivot-bolt $a$.

Pivoted to the pole D by the pivot-bolt $b$ is the equalizing-lever F, which lever can be made of wood or metal and about sixteen inches (more or less) long, and it has made with each half portion and toward their outer ends a series of draft-adjusting holes $c\ c'\ c^3$, the purposes of which will be hereinafter explained. Pivoted with the said draft-equalizing lever F from one of its draft-adjusting holes, as $e'$, is the connection rod, bar, or strap E, of length about twelve inches, more or less, and to the forward end of this connection-piece E is pivoted the doubletree G, made of wood or metal and of suitable proportions for operation. Coupled with this doubletree G are the singletrees H, made with any known form of construction and pivoted to the ends of the doubletree in any known manner practiced by the trade.

I is the leader draft-rod, having a pivot connection with the end of the equalizing-lever F opposite from the draft connection E. The pivot connection of this rod with said draft-lever is made by one of the series of adjusting draft-holes in the said end of that lever, as shown in Fig. 1. This rod is extended forward lengthwise with the tongue D to near the forward end of the same and terminates, preferably, with a loop or eye $d$, which can be made to communicate at will with the holding-staple $e$, fixed to the under side of the tongue. With this draft-connection rod I is connected a flexible extension I', preferably in the form of a chain, as shown. Yet it can be made to consist of a second rod linked with rod I. This forward extension I' is provided with a draft-hook $f$ for holding with a doubletree or whiffletree J, to which are to be attached the leading animal or animals for drawing the vehicle or its equivalent.

K is a suitable strap or loop secured with tongue D and receiving the forward end portion of the draft-rod I. The holding device $e$ occurs in the course of the tongue D at a point corresponding with the loop or eye $d$ at the end of the rod I when the equalizing-lever F is about at right angles to the direction of length of the tongue, and when the loop $d$ of this rod is made to engage with the holding device $e$ it is to be secured in place by a pin $e'$, inserted in the loop of the holding device, or by other means, which will retain the forward end of this draft-connecting rod in engagement with piece $e$, and when so connected the equalizing-lever F will be held from moving in either direction, and the draft from the doubletree G (through the connection or strap E with the equalizing-lever F) will be communicated to the tongue D through the said equalizing-lever, and the doubletree will be free to swing on its pivot c. When the loop d of the draft-rod I is out of engagement with the holding device e, and the leaders are attached to the doubletree J, (connected by hook f and chain I′ to the draft-rod I,) the draft of the animals will be brought on the right-hand end of the equalizing-lever F and react against the draft of the wheel-animals attached to the singletrees H, secured to the doubletree G, by the draft from the left-hand end of the equalizing-lever F reacting through the connection E with the doubletree G. At the same time the draft of the wheel-animals attached to the singletrees H H will, through the doubletree G, connection E, and equalizing-lever F, react on the leading-animals secured to the doubletree J, connected with the draft-rod I, and the united pull of the leaders attached to the doubletree J will be exerted through the equalizing-lever F on the draw-pivot bolt b, securing said lever with the tongue D in about the same ratio as the pull of the wheel-horses on their respective singletrees H H, communicating also with the tongue D through the doubletree G, connection E, and equalizing-lever F.

When the leading-animals attached to doubletree J are stronger than the wheel-animals attached to the singletrees H H, the draft-bolt s, shown to be secured in the draft-adjusting hole c′ of the equalizing-lever F, will be set inward toward draft-bolt b, as at draft-adjusting hole $c^2$, while the draft-bolt s of the connection E, with the equalizing-lever F, will be shifted outwardly to hold with the outer draft-adjusting hole c, when the stronger animals attached to the leading doubletree J will be made to do more work than the weaker wheel-animals attached to whiffletrees H H; but when the wheel-animals are strongest the connection E will be shifted toward the draw-bolt b as to engage with draft-hole $c^2$, while the draw-rod I will have its connection with the equalizing-lever F shifted outwardly to adjusting draft-hole, c at the opposite end, when the wheel-animals will be made to exert a greater draft on the load than the leading animals. When the leaders and wheel-animals are at first attached to their respective singletrees, the animal starting first will, through the equalizing-lever F, connection E, and draft-rod I, immediately bring the draft of the load on the animals last started and in such nice adjusted proportion as to cause each animal at the starting of the load to pull its proportion of the same. A chain or flexible connection k is secured to the loop at the end of the tongue D and holds up the forward end of the flexible extension I′ of the draw-rod I. This chain operates to hold the doubletree J and its attached singletrees (not shown) of the leading-animals from dropping down. By thus holding the leaders' doubletree J from the chain or connection k the draft of the animals on the flexible connection I′ and the draft-rod I will not in the least add any additional weight to the end of the tongue supported from the necks of the wheel-animals through the neck-yoke L, and the neck-yoke L can vibrate vertically, more or less, without materially affecting the position of the doubletree J. A loop g, secured to the lower side of the doubletree G and receiving the rear end portion of the draft-rod I, holds the said doubletree in place and coacts with connection E to keep said doubletree from shifting.

My above-described improvements can be readily employed with any team, wagon, or truck, post-coaches, road-machines requiring four or more horses, or to agricultural implements, such as harrows, seeders, &c.

Having described my invention, what I claim, and desire to secure by Letters Patent, is—

1. The combination, with the doubletree G, provided with the loop g, of tongue D, equalizing-lever F, pivoted to said tongue and by a suitable connection to the doubletree, and the draw-rod I, substantially as and for the purposes set forth.

2. The combination, with the equalizing-lever F, pivoted with tongue D and having one end pivoted to doubletree G by a connecting-piece and its opposite end to a draft-rod I, of the flexible extension I′ and support k, connecting said extension with the end of the tongue and draft-hook f, substantially as and for the purposes set forth.

3. The combination, with the tongue D, doubletree G, and draft-rod I, provided with draft-hook f, of the equalizing-lever F, provided at each end with a series of draft-adjusting holes, and pivot-bolts for holding with the same and pivoted at its middle of length to the tongue D, substantially as and for the purposes set forth.

RUSSELL WICKHAM.

Witnesses:
CHARLES SELKIRK,
WILLIAM F. SELKIRK.